(12) United States Patent
Inoue

(10) Patent No.: US 10,169,690 B2
(45) Date of Patent: Jan. 1, 2019

(54) COMMUNICATION DEVICE THAT COMMUNICATES WITH EXTERNAL DEVICE, CONTROL METHOD FOR THE SAME, AND STORAGE MEDIUM

(71) Applicant: CANON KABUSHIKI KAISHA, Tokyo (JP)

(72) Inventor: Go Inoue, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/584,092

(22) Filed: May 2, 2017

(65) Prior Publication Data

US 2017/0330062 A1 Nov. 16, 2017

(30) Foreign Application Priority Data

May 12, 2016 (JP) ................................ 2016-096158

(51) Int. Cl.
*G06K 19/06* (2006.01)
*H04W 4/80* (2018.01)
*H04W 80/04* (2009.01)

(52) U.S. Cl.
CPC ........ *G06K 19/06037* (2013.01); *H04W 4/80* (2018.02); *H04W 80/045* (2013.01)

(58) Field of Classification Search
USPC ...................................................... 358/1.15
See application file for complete search history.

(56) References Cited

U.S. PATENT DOCUMENTS

| 8,848,106 | B2 | 9/2014 | Ohmae et al. | |
|---|---|---|---|---|
| 9,426,321 | B2 | 8/2016 | Sumita et al. | |
| 2006/0067343 | A1* | 3/2006 | Tagawa | H04L 41/22 370/401 |
| 2007/0067734 | A1* | 3/2007 | Cunningham | G06F 3/04817 715/779 |
| 2013/0250358 | A1* | 9/2013 | Suzuki | H04L 67/14 358/1.15 |
| 2014/0247396 | A1* | 9/2014 | Ohmae | H04N 21/43615 348/705 |
| 2015/0077790 | A1* | 3/2015 | Nagasawa | G06F 3/1285 358/1.15 |

FOREIGN PATENT DOCUMENTS

| JP | 2013062786 A | 4/2013 |
|---|---|---|
| JP | 2013184296 A | 9/2013 |

* cited by examiner

*Primary Examiner* — Ngon Nguyen
(74) *Attorney, Agent, or Firm* — Rossi, Kimms & McDowell LLP

(57) ABSTRACT

A communication device capable of certainly preventing an external device incompatible with an IPv6 address from acquiring the IPv6 address. A display unit is controlled so as to display a QR image including an IPv4 address of the communication device when the IPv4 address is valid in the communication device. When the IPv4 address is invalid and the IPv6 address is valid in the communication device, the display unit is controlled so as not to display a QR image including the IPv6 address of the communication device.

12 Claims, 22 Drawing Sheets

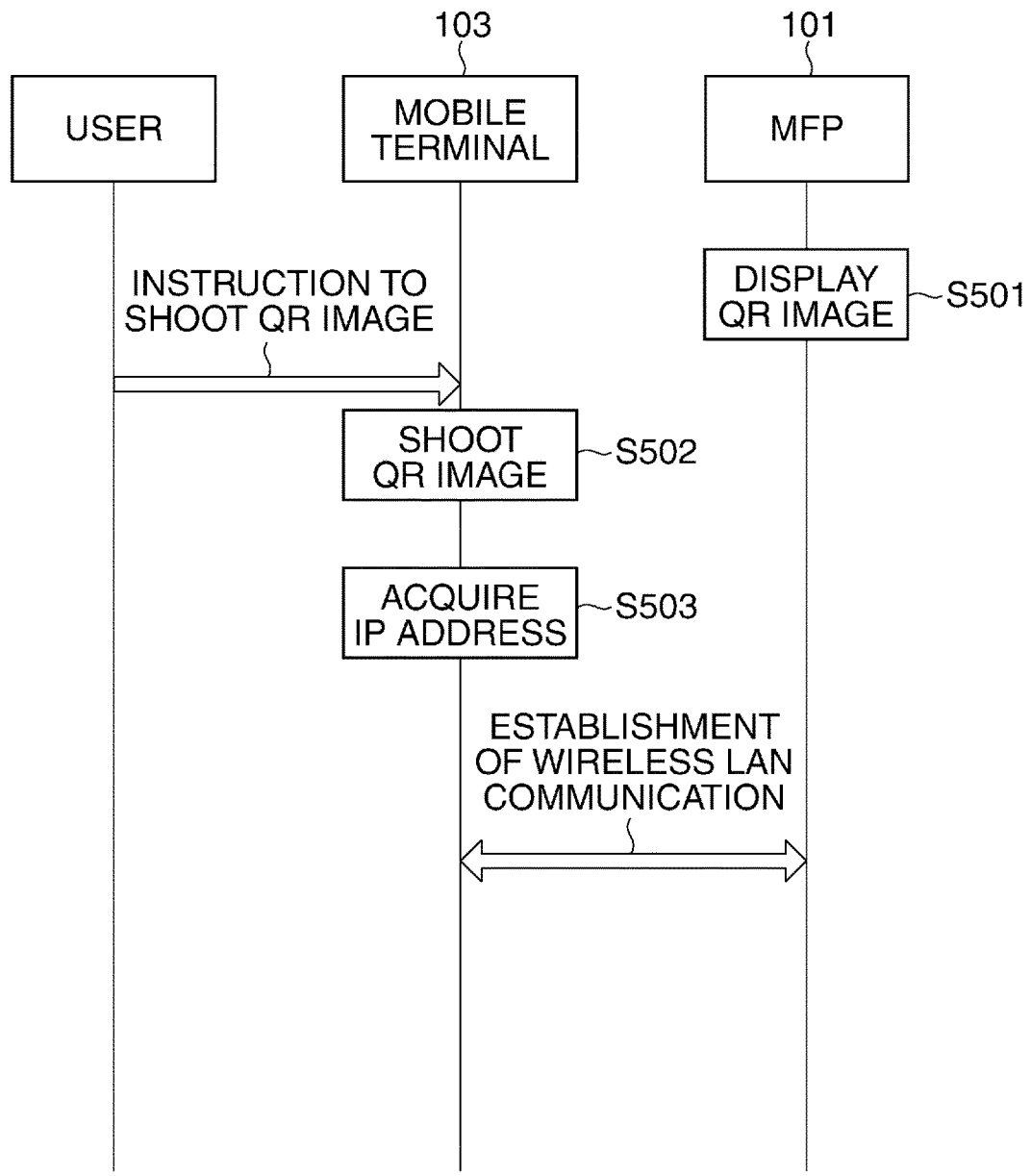

FIG. 6A

601 cname=Canon<LF>
div=MFP<LF>
ipv4=192.168.22.1<LF>
mac=009C02CE358E<LF>
ssid=DIRECT-1F_Canon10<LF>
key=1234567890

FIG. 6B

602 cname=Canon<LF>
div=MFP<LF>
mac=009C02CE358E<LF>
ssid=DIRECT-1F_Canon10<LF>
key=1234567890

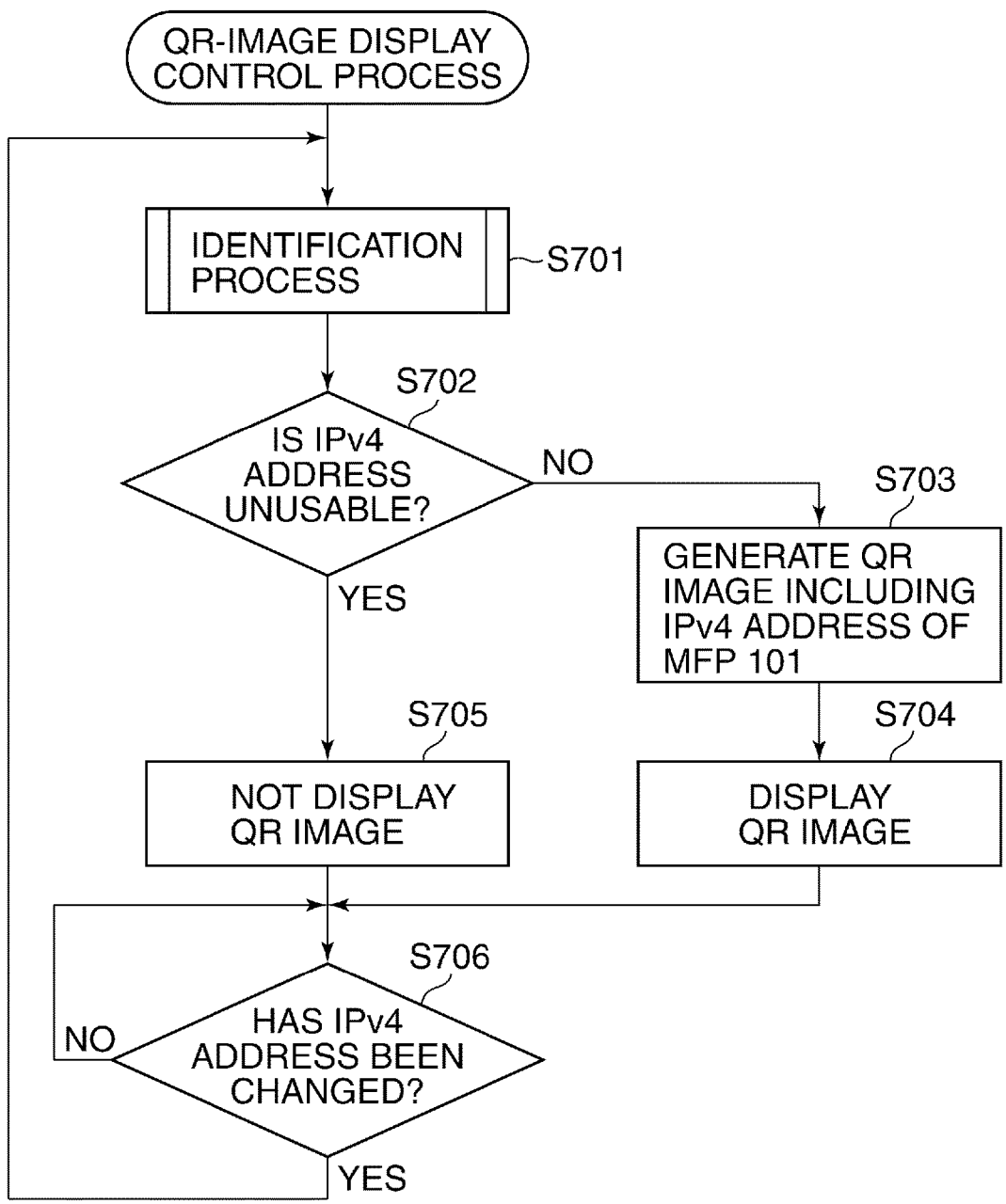

```
cname=Canon<LF>
div=MFP<LF>
ipv4=0.0.0.0<LF>
mac=009C02CE358E<LF>
ssid=DIRECT-1F_Canon10<LF>
key=1234567890
```

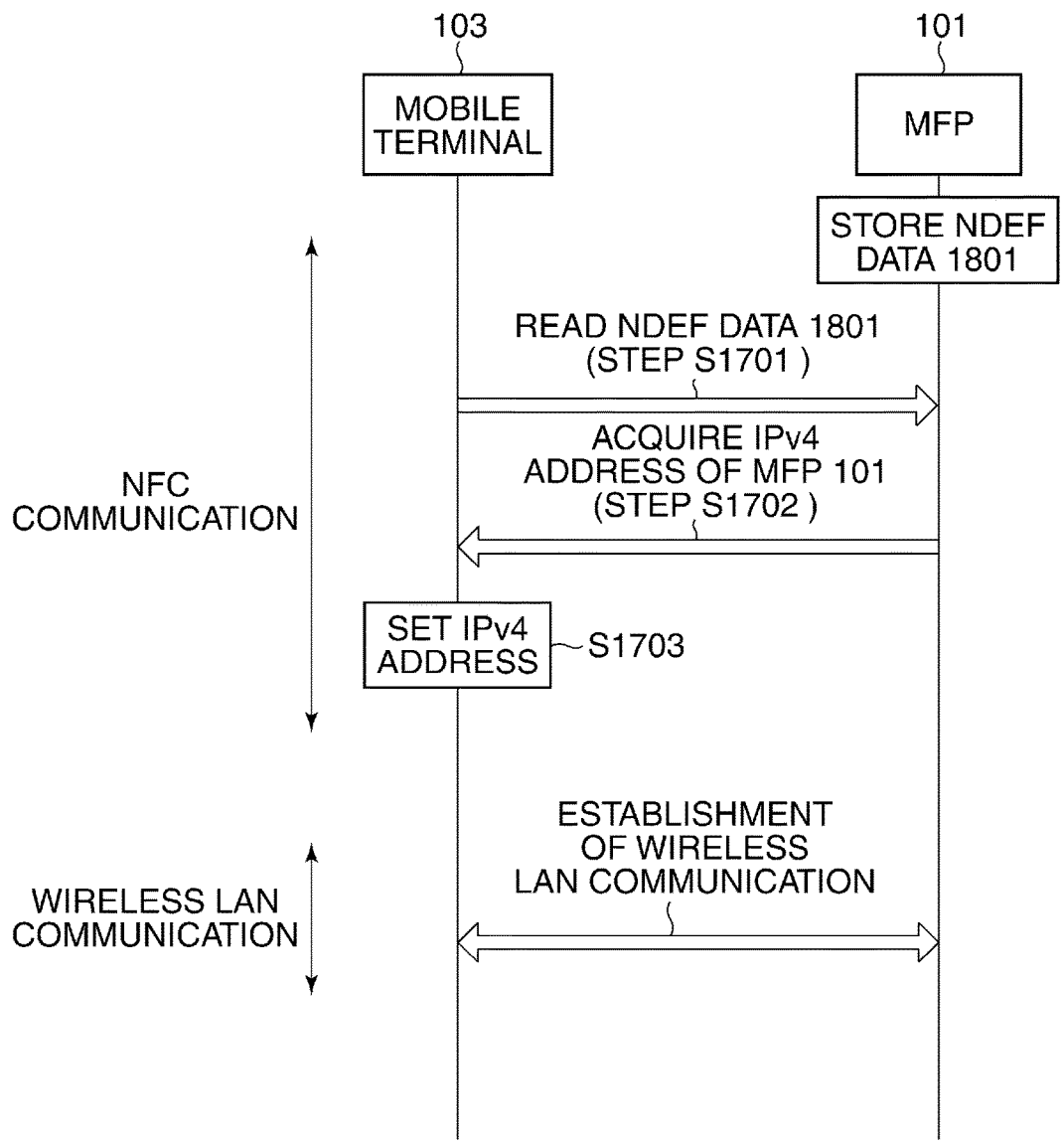

COMMUNICATION DEVICE THAT COMMUNICATES WITH EXTERNAL DEVICE, CONTROL METHOD FOR THE SAME, AND STORAGE MEDIUM

BACKGROUND OF THE INVENTION

Field of the Invention

The present invention relates to a communication device, a control method for the communication device, and a storage medium.

Description of the Related Art

An MFP as a communication device with a wireless LAN communication function is known. The MFP outputs an IP (Internet Protocol) address of the MFP, including address information of the MFP, to perform wireless LAN communication with an external device such as a mobile terminal installed with a communication application for performing data communication with the MFP. For example, the MFP displays a QR image including the IP address of the MFP on an operation panel of the MFP. Furthermore, the MFP performs near field communication, such as NFC (Near Field radio Communication) or BLE (Bluetooth™ Low Energy), and transmits the IP address of the MFP to the mobile terminal (for example, see Japanese Laid-Open Patent Publication (kokai) No. 2013-184296 and Japanese Laid-Open Patent Publication (kokai) No. 2013-62786). When the mobile terminal has set the IP address of the MFP output from the MFP, the MFP and the mobile terminal can perform wireless LAN communication between them.

In the wireless LAN communication, an IP address in version 4 (hereinafter, referred to as an "IPv4 address") or an IP address in version 6 (hereinafter, referred to as an "IPv6 address") is used as an IP address. The mobile terminal acquires, out of an IPv4 address and an IPv6 address, an IP address in a version compatible with the communication application of the mobile terminal from the MFP.

However, conventionally, a mobile terminal may sometimes acquire an IP address in a version incompatible with a communication application of the mobile terminal from an MFP. Specifically, when a user has set the output of an IPv6 address in the MFP, the MFP does not output an IPv4 address and outputs only an IPv6 address. In this case, even when the mobile terminal has been installed with a communication application compatible with an IPv4 address only, the mobile terminal acquires an IPv6 address of the MFP from the MFP. As a result, the mobile terminal performs an unwanted process of analyzing the IPv6 address, and the load of analysis of an IP address is increased more than necessary.

SUMMARY OF THE INVENTION

The present invention provides a communication device capable of certainly preventing an external device incompatible with an IPv6 address from acquiring the IPv6 address, a control method for the communication device, and a storage medium.

Accordingly, the present invention provides a communication device comprising a display unit and a control unit configured to control the display unit so as to display a QR image including an IPv4 address of the communication device when the IPv4 address is valid in the communication device, wherein when the IPv4 address is invalid and an IPv6 address is valid in the communication device, the display unit does not display a QR image including the IPv6 address of the communication device.

According to the present invention, the external device incompatible with the IPv6 address can be prevented from acquiring the IPv6 address.

Further features of the present invention will become apparent from the following description of exemplary embodiments (with reference to the attached drawings).

BRIEF DESCRIPTION OF THE DRAWINGS

FIG. 5 is a timing chart showing the procedure of a wireless-LAN-communication setting process using a QR image displayed on the MFP shown in FIG. 1.

FIGS. 6A and 6B are diagrams showing an example of QR data generated by the MFP shown in FIG. 1.

FIG. 7 is a flowchart showing the procedure of a QR-image display control process performed by the MFP shown in FIG. 1.

FIG. 10 is a diagram showing an example of QR data generated in the process shown in FIG. 9.

FIG. 17 is a timing chart showing the procedure of a wireless-LAN-communication setting process using NFC communication performed by the communication system shown in FIG. 1.

DESCRIPTION OF THE EMBODIMENTS

Embodiments of the present invention will be described in detail below with reference to drawings.

In the present embodiments, there is described a case where the present invention is applied to an MFP as a communication device; however, an object to which the present invention is applied is not limited to an MFP, and the present invention can also be applied to any other devices, such as a personal computer (PC) and a camera, as long as the devices can perform data communication with an external device.

Figure 1:
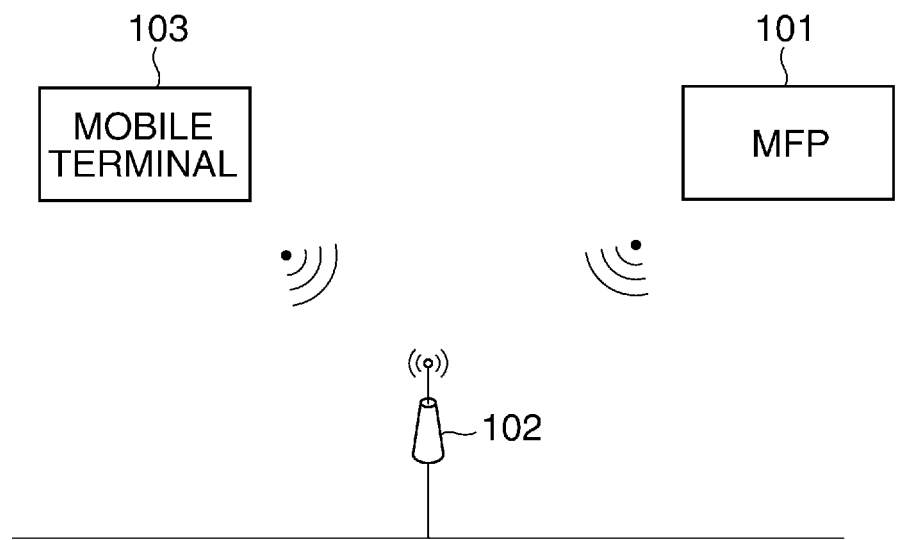
FIG. 1 is a configuration diagram schematically showing a configuration of a communication system including an MFP as a communication device according to a first embodiment of the present invention.

FIG. 1 is a configuration diagram schematically showing a configuration of a communication system 100 including an MFP 101 as a communication device according to a first embodiment of the present invention.

In FIG. 1, the communication system 100 includes the MFP 101, an access point 102, and a mobile terminal 103 as an external device.

The MFP 101 is compatible with both an IPv (Internet Protocol version) 4 address and an IPv6 address. In the MFP 101, whether or not each address is allowed to be used is set to the IPv4 address and the IPv6 address by a user setting through a setting screen 300 shown in FIG. 3 to be described later. The MFP 101 outputs, out of the IPv4 address and the IPv6 address, the IP address allowed to be used. For example, the MFP 101 displays a QR image including the IP address allowed to be used on an operation display unit 214 shown in FIG. 2 to be described later. Furthermore, the MFP 101 transmits the IP address allowed to be used to the mobile terminal 103 by near field communication, such as NFC (Near Field radio Communication) communication or BLE communication. The access point 102 is a DHCP server, and assigns the MFP 101 and the mobile terminal 103 IP addresses, respectively, and notifies the MFP 101 and the mobile terminal 103 of the respective assigned IP addresses. The mobile terminal 103 has been installed with a communication application (not shown) for performing data communication with the MFP 101. The mobile terminal 103 reads the QR image displayed on the MFP 101, and performs near field communication and acquires an IP address in a version compatible with the communication application of the mobile terminal 103 from the MFP 101, and then sets the IP address. Accordingly, the MFP 101 and the mobile terminal 103 can perform wireless LAN communication between them via the access point 102. Incidentally, in the present embodiment, there is described the communication via the access point 102 as an example of wireless LAN communication; however, the wireless LAN communication is not limited to the communication via the access point 102. For example, the MFP 101 and the mobile terminal 103 can directly perform wireless LAN communication by Wi-Fi Direct or the like without the access point 102.

Figure 2:
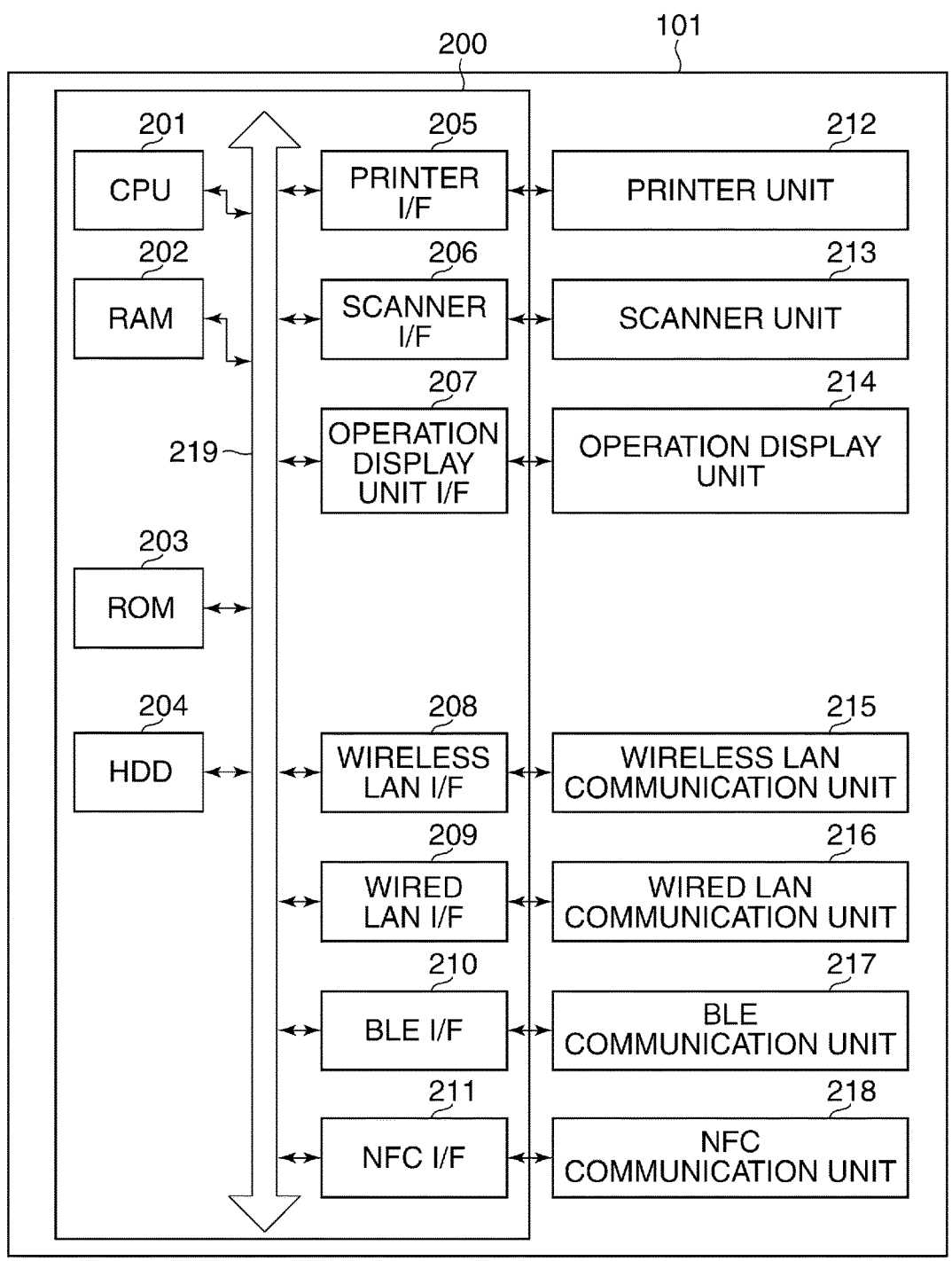
FIG. 2 is a block diagram schematically showing a configuration of the MFP shown in FIG. 1.
Figure 3:
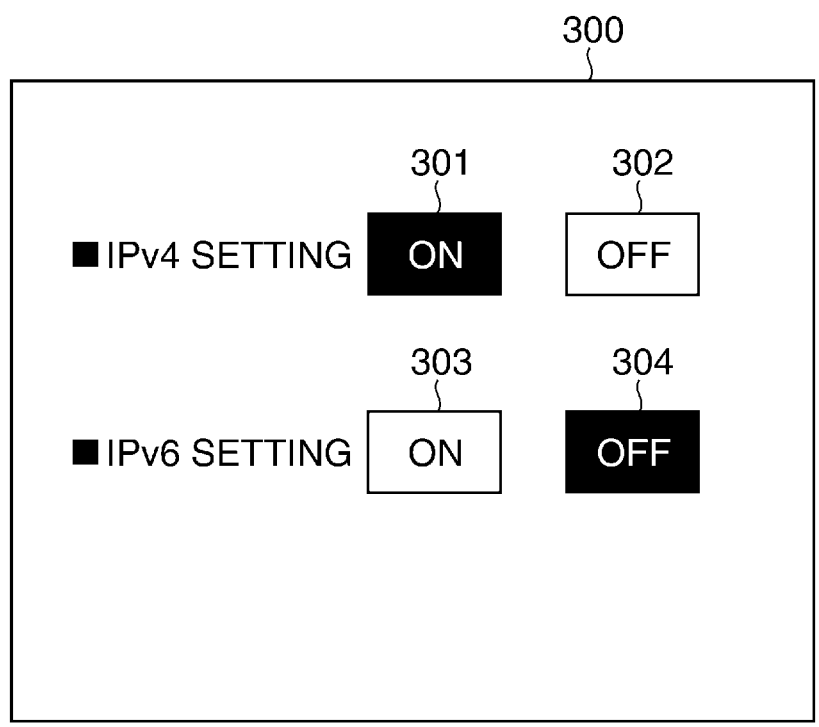
FIG. 3 is a diagram showing an example of a setting screen displayed on an operation display unit shown in FIG. 2.

FIG. 2 is a block diagram schematically showing a configuration of the MFP 101 shown in FIG. 1.

In FIG. 2, the MFP 101 includes a control unit 200, a printer unit 212, a scanner unit 213, the operation display unit 214, a wireless LAN communication unit 215, a wired LAN communication unit 216, a BLE communication unit 217, and an NFC communication unit 218. The control unit 200 is connected to the printer unit 212, the scanner unit 213, the operation display unit 214, the wireless LAN communication unit 215, the wired LAN communication unit 216, the BLE communication unit 217, and the NFC communication unit 218. The control unit 200 includes a CPU 201, a RAM 202, a ROM 203, an HDD 204, a printer I/F 205, a scanner I/F 206, an operation display unit I/F 207, a wireless LAN I/F 208, a wired LAN I/F 209, a BLE I/F 210, and an NFC I/F 211. The CPU 201, the RAM 202, the ROM 203, the HDD 204, the printer I/F 205, the scanner I/F 206, the operation display unit I/F 207, the wireless LAN I/F 208, the wired LAN I/F 209, the BLE I/F 210, and the NFC I/F 211 are connected to one another via a system bus 219.

The control unit 200 controls the entire MFP 101. The CPU 201 executes a program stored in the ROM 203 or the HDD 204 and performs the control in accordance with the program. The RAM 202 is used as a work area of the CPU 201 and a temporary storage area of data. The ROM 203 stores therein a program executed by the CPU 201, an IP address of the MFP 101 notified from the access point 102, etc. The HDD 204 stores therein a program and data. The printer I/F 205 performs data communication with the printer unit 212; the scanner I/F 206 performs data communication with the scanner unit 213; the operation display unit I/F 207 performs data communication with the operation display unit 214. The wireless LAN I/F 208 performs data communication with the wireless LAN communication unit 215; the wired LAN I/F 209 performs data communication with the wired LAN communication unit 216; the BLE I/F 210 performs data communication with the BLE communication unit 217. The NFC I/F 211 performs data communication with the NFC communication unit 218.

The printer unit 212 performs printing based on print data or the like acquired from the mobile terminal 103. The scanner unit 213 generates image data by reading an original set in an original table (not shown). The operation display unit 214 includes a display unit (not shown) having a touch panel function and a keyboard (not shown). For example, the operation display unit 214 displays thereon a QR image including an IP address of the MFP 101. Furthermore, the operation display unit 214 displays thereon the setting screen 300 shown in FIG. 3 through which a user sets whether or not each of the IPv4 address and the IPv6 address is allowed to be used. The setting screen 300 includes ON buttons 301 and 303 and OFF buttons 302 and 304. When the user has set the ON button 301 or 303, the use of the corresponding IPv4 address or IPv6 address is allowed. When the user has set the OFF button 302 or 304, the use of the corresponding IPv4 address or IPv6 address is not allowed. The wireless LAN communication unit 215 performs wireless LAN communication with the mobile terminal 103 by using, out of the IPv4 address and the IPv6 address, the IP address allowed to be used in the setting of the setting screen 300. The wired LAN communication unit 216 performs wired LAN communication with an external device connected via a LAN cable (not shown). The BLE communication unit 217 performs BLE communication with an external device capable of performing BLE communication; the NFC communication unit 218 performs NFC communication with an external device capable of performing NFC communication.

Figure 4:
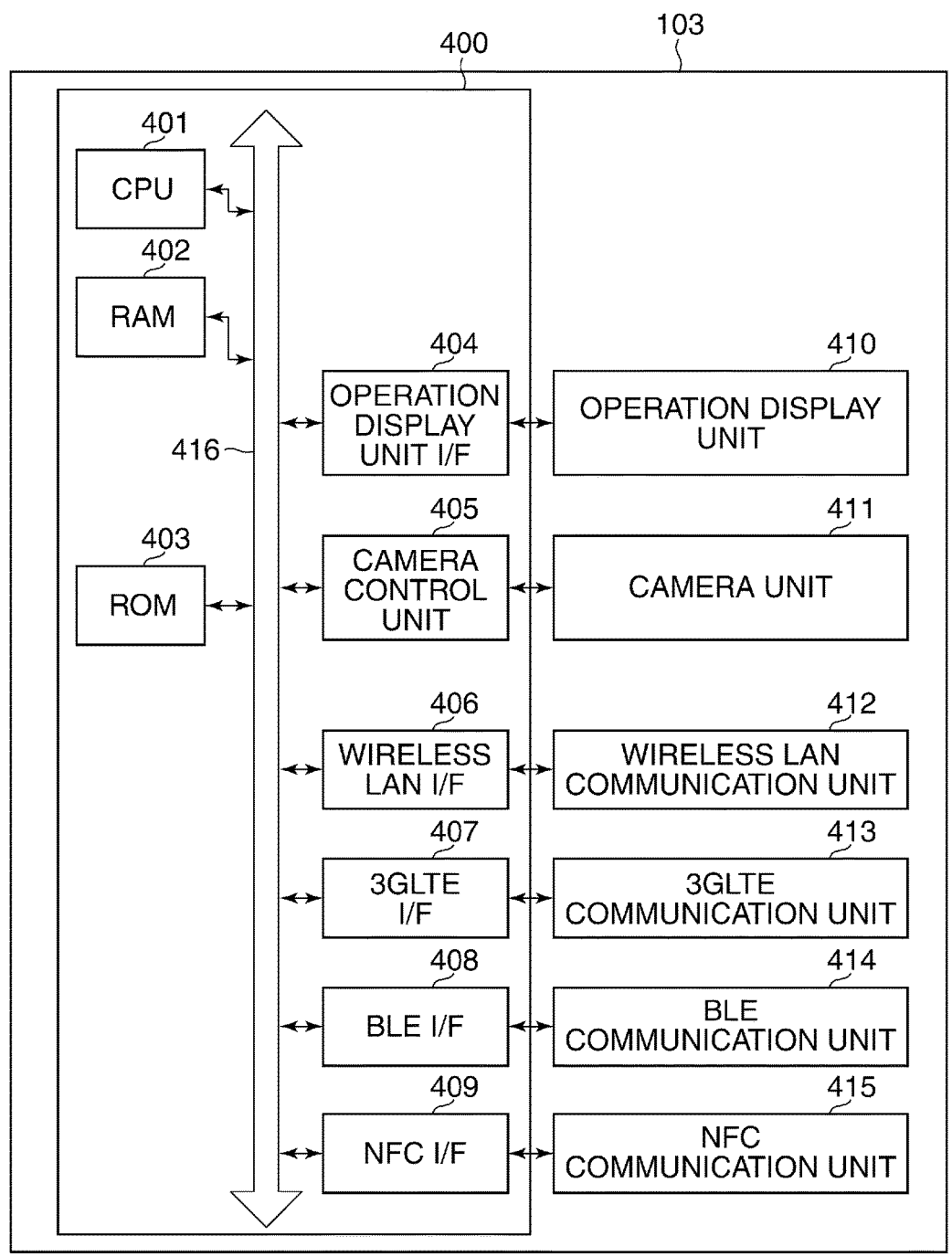
FIG. 4 is a block diagram schematically showing a configuration of a mobile terminal shown in FIG. 1.

FIG. 4 is a block diagram schematically showing a configuration of the mobile terminal 103 shown in FIG. 1.

In FIG. 4, the mobile terminal 103 includes a control unit 400, an operation display unit 410, a camera unit 411, a wireless LAN communication unit 412, a 3G/LTE communication unit 413, a BLE communication unit 414, and an NFC communication unit 415. The control unit 400 is connected to the operation display unit 410, the camera unit 411, the wireless LAN communication unit 412, the 3G/LTE communication unit 413, the BLE communication unit 414, and the NFC communication unit 415. The control unit 400 includes a CPU 401, a RAM 402, a ROM 403, an operation display unit I/F 404, a camera control unit 405, a wireless LAN I/F 406, a 3GLTE I/F 407, a BLE I/F 408, and an NFC I/F 409. The CPU 401, the RAM 402, the ROM 403, the operation display unit I/F 404, the camera control unit 405, the wireless LAN I/F 406, the 3GLTE I/F 407, the BLE I/F 408, and the NFC I/F 409 are connected to one another via a system bus 416.

The control unit 400 controls the entire mobile terminal 103. The CPU 401 executes a program stored in the ROM 403 and performs the control in accordance with the program. The RAM 402 is used as a work area of the CPU 401 and a temporary storage area of data. The ROM 403 stores therein a program executed by the CPU 401 and data. The operation display unit I/F 404 performs data communication with the operation display unit 410; the camera control unit 405 performs data communication with the camera unit 411; the wireless LAN I/F 406 performs data communication with the wireless LAN communication unit 412. The 3GLTE I/F 407 performs data communication with the 3G/LTE communication unit 413; the BLE I/F 408 performs data communication with the BLE communication unit 414; the NFC I/F 409 performs data communication with the NFC communication unit 415.

The operation display unit 410 includes a display unit (not shown) having a touch panel function and a keyboard (not shown). The camera unit 411 shoots a QR image displayed on the MFP 101, and acquires an IP address of the MFP 101 from the QR image and so on. The wireless LAN communication unit 412 performs wireless LAN communication with the MFP 101 via the access point 102. The 3G/LTE communication unit 413 performs 3G communication and LTE communication with a base station. The BLE communication unit 414 performs BLE communication with an external device capable of performing BLE communication; the NFC communication unit 415 performs NFC communication with an external device capable of performing NFC communication.

Subsequently, there is described a case where in the communication system 100, the setting of wireless LAN communication is performed by using a QR image displayed on the operation display unit 214 of the MFP 101.

FIG. 5 is a timing chart showing the procedure of a wireless-LAN-communication setting process using a QR image displayed on the MFP 101 shown in FIG. 1.

In FIG. 5, first, the MFP 101 generates a QR image on the basis of QR data 601 shown in FIG. 6A including information required for the setting of wireless LAN communication. The QR data includes an IP address in a version allowed to be used in the setting of the setting screen 300, and does not include an IP address in a version not allowed to be used. For example, when neither the IPv4 address nor the IPv6 address is allowed to be used in the setting of the setting screen 300, QR data 602 includes no IP addresses as shown in FIG. 6B. Then, the MFP 101 displays the generated QR image on the operation display unit 214 (step S501). After that, when a user has issued an instruction to the mobile terminal 103 to shoot the QR image, the mobile terminal 103 shoots the QR image displayed on the operation display unit 214 of the MFP 101 (step S502), and acquires the IP address of the MFP 101 from the QR image (step S503). Then, the mobile terminal 103 sets the acquired IP address of the MFP 101. Accordingly, wireless LAN communication is established between the MFP 101 and the mobile terminal 103. After that, the communication system 100 ends the present process.

Here, if only the IPv6 address has been allowed to be used in the setting of the setting screen 300, a conventional MFP displays a QR image including, out of the IPv4 address and the IPv6 address, only the IPv6 address on the operation display unit 214. In this case, when the mobile terminal 103 has read the QR image, even if the mobile terminal 103 is incompatible with the IPv6 address, the mobile terminal 103 acquires the IPv6 address.

To cope with this, in the present embodiment, neither the IPv4 address nor the IPv6 address is configured to be output if the IPv4 address is unusable.

FIG. 7 is a flowchart showing the procedure of a QR-image display control process performed by the MFP 101 shown in FIG. 1.

The process shown in FIG. 7 is performed by the CPU 201 executing a program stored in the ROM 203 and the HDD 204. In the process shown in FIG. 7, to make the description easy, it is assumed that the use of the IPv6 address has been allowed in the setting of the setting screen 300.

In FIG. 7, first, the CPU 201 performs an identification process shown in FIG. 8 to be described later, and identifies whether or not the IPv4 address of the MFP 101 is valid (step S701). Then, the CPU 201 determines whether or not the IPv4 address of the MFP 101 is unusable on the basis of a result of the identification in step S701 (step S702). For example, when the result of the identification in step S701 is that the IPv4 address of the MFP 101 is valid, the CPU 201 determines that the IPv4 address is usable. On the other hand, when the result of the identification in step S701 is that the IPv4 address of the MFP 101 is invalid, the CPU 201 determines that the IPv4 address is unusable.

When a result of the determination in step S702 is that the IPv4 address of the MFP 101 is usable, the CPU 201 generates a QR image including the IPv4 address of the MFP 101 stored in the ROM 203 (step S703). Then, the CPU 201 displays the generated QR image on the operation display unit 214 (step S704). After that, the CPU 201 performs a process in step S706 described below.

When a result of the determination in step S702 is that the IPv4 address of the MFP 101 is unusable, the CPU 201 outputs neither the IPv4 address nor the IPv6 address of the MFP 101 (an output control unit). Specifically, the CPU 201 does not display a QR image including the IP address of the MFP 101 on the operation display unit 214 (step S705). Then, the CPU 201 determines whether or not the IPv4 address of the MFP 101 has been changed (step S706), and waits until the IPv4 address of the MFP 101 has been changed. For example, when the CPU 201 has been notified of a different IP address from the IPv4 address stored in the ROM 203 from the access point 102, or when a lease period of the IPv4 address has expired, the CPU 201 determines that the IP address has been changed. When the IPv4 address of the MFP 101 has been changed (YES in step S706), the CPU 201 returns to the process in step S701.

Figure 8:
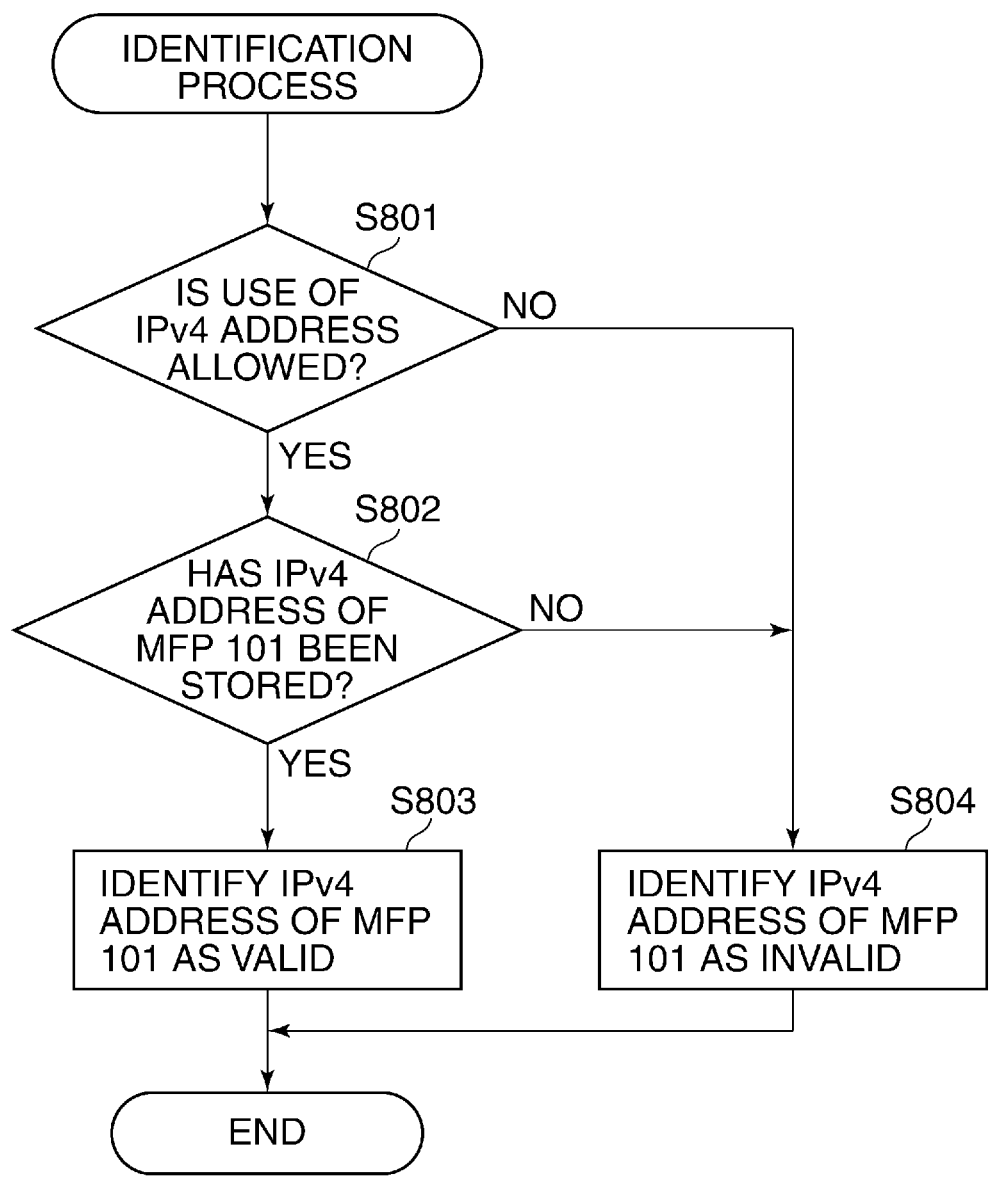
FIG. 8 is a flowchart showing the procedure of an identification process in step S701 shown in FIG. 7.

FIG. 8 is a flowchart showing the procedure of the identification process in step S701 shown in FIG. 7.

In FIG. 8, first, the CPU 201 determines whether or not the use of the IPv4 address is allowed in the setting of the setting screen 300 (step S801).

When a result of the determination in step S801 is that the use of the IPv4 address is not allowed, the CPU 201 performs a process in step S804 to be described below. On the other hand, when a result of the determination in step S801 is that the use of the IPv4 address is allowed, the CPU 201 determines whether or not the IPv4 address of the MFP 101 notified from the access point 102 has been stored in the ROM 203 or the like (step S802).

When a result of the determination in step S802 is that the IPv4 address of the MFP 101 has been stored, the CPU 201 identifies the IPv4 address of the MFP 101 as valid (step S803), and ends the present process. On the other hand, when a result of the determination in step S802 is that the IPv4 address of the MFP 101 has not been stored, the CPU 201 identifies the IPv4 address of the MFP 101 as invalid (step S804), and ends the present process.

According to the above-described processes shown in FIGS. 7 and 8, if the IPv4 address is unusable, neither the IPv4 address nor the IPv6 address is output. Accordingly, it is possible to avoid the situation in which only the IPv6 address is output, and therefore it is possible to certainly prevent the mobile terminal 103 incompatible with the IPv6 address from acquiring the IPv6 address.

Furthermore, in the above-described processes shown in FIGS. 7 and 8, if the IPv4 address is unusable, a QR image is not displayed. Accordingly, it is possible to certainly prevent the mobile terminal 103 incompatible with the IPv6 address from acquiring the IPv6 address from the QR image.

The present invention is described above with the above-described embodiment; however, the present invention is not limited to the above-described embodiment.

For example, when the IPv4 address is unusable, an IPv4 address indicating that address information of the MFP 101 has not been set can be output.

Figure 9:
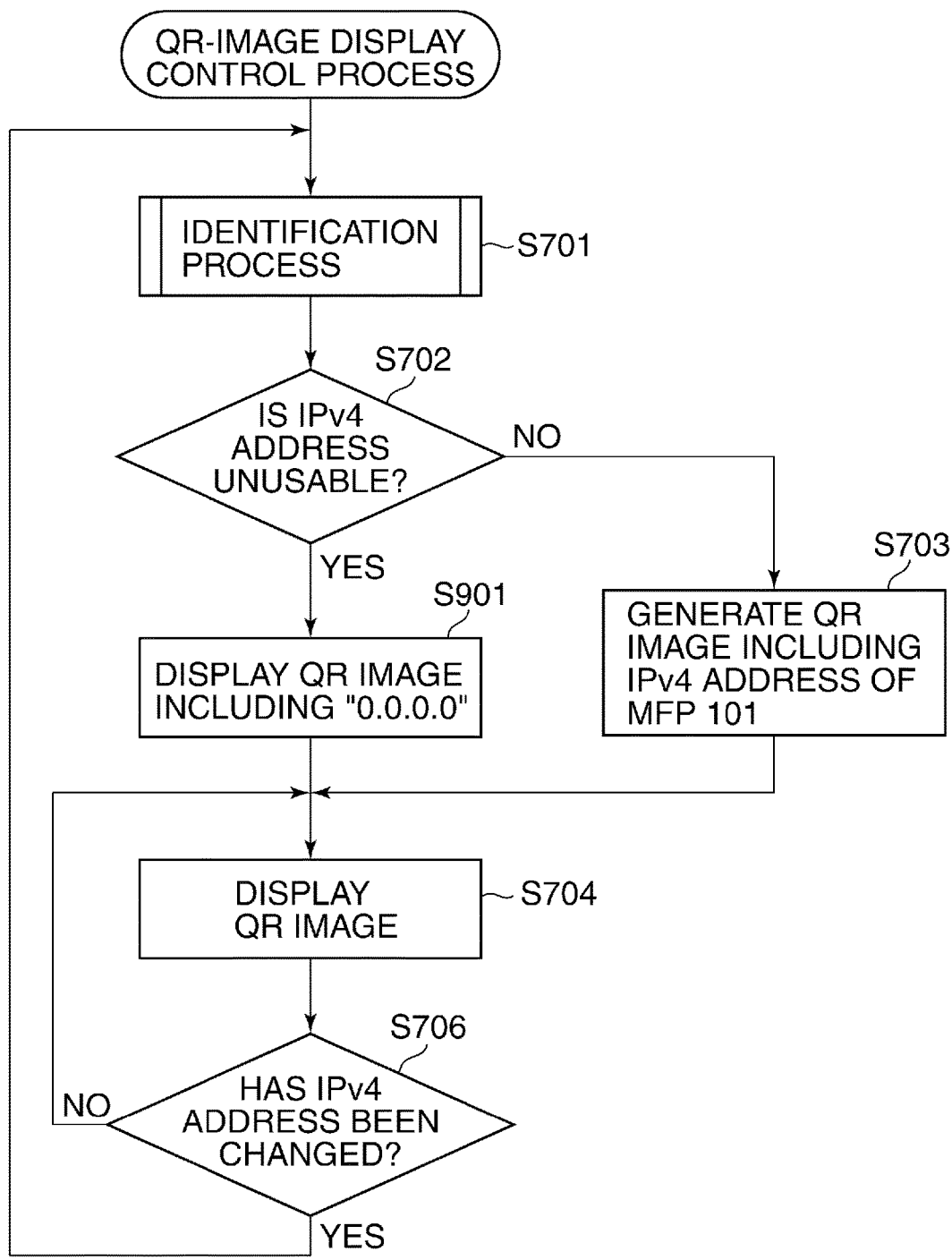
FIG. 9 is a flowchart showing the procedure of a variation of the QR-image display control process shown in FIG. 7.

FIG. 9 is a flowchart showing the procedure of a variation of the QR-image display control process shown in FIG. 7.

The process shown in FIG. 9 is performed by the CPU 201 executing a program stored in the ROM 203 and the HDD 204. Also in the process shown in FIG. 9, to make the description easy, it is assumed that the use of the IPv6 address has been allowed in the setting of the setting screen 300.

In FIG. 9, first, the CPU 201 performs the processes in steps S701 and S702 in FIG. 7.

When a result of determination in step S702 is that the IPv4 address of the MFP 101 is usable, the CPU 201 performs the processes in steps S703 onward. On the other hand, when a result of determination in step S702 is that the IPv4 address of the MFP 101 is unusable, the CPU 201 generates QR data 1001 shown in FIG. 10 in which "0.0.0.0", which indicates that address information as the IPv4 address has not been set, is set. After that, the CPU 201 generates a QR image based on the QR data 1001 (step S901), and performs the processes in steps S704 onward.

Figure 11:
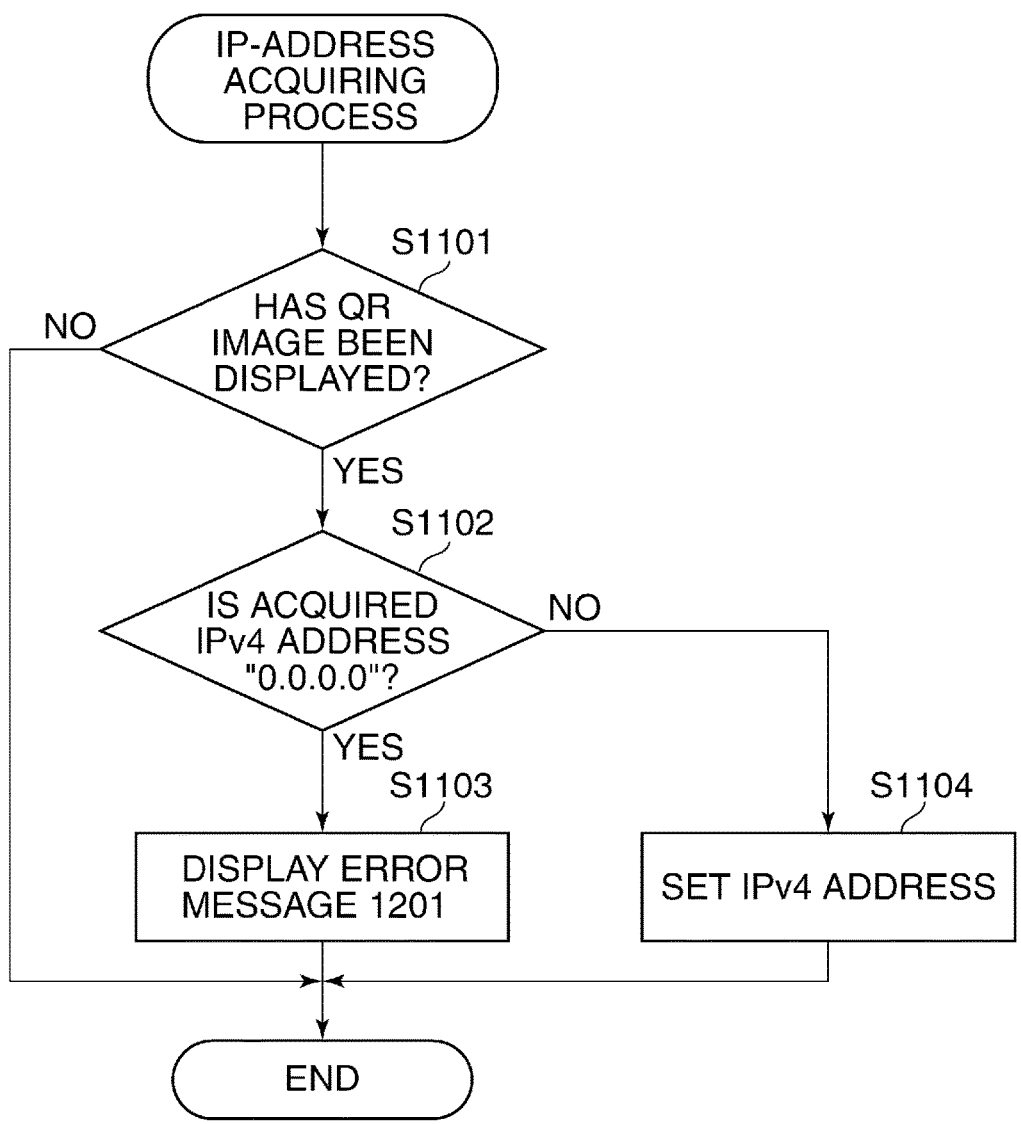
FIG. 11 is a flowchart showing the procedure of an IP-address acquiring process performed by the mobile terminal shown in FIG. 1.

FIG. 11 is a flowchart showing the procedure of an IP-address acquiring process performed by the mobile terminal 103 shown in FIG. 1.

The process shown in FIG. 11 is performed by the CPU 401 executing a program stored in the ROM 403, and it is assumed that the mobile terminal 103 is compatible with the IPv4 address only.

In FIG. 11, when a user has passed the mobile terminal 103 over the operation display unit 214 of the MFP 101 in order to read a QR image, the CPU 401 determines whether or not the QR image has been displayed on the operation display unit 214 (step S1101).

When a result of the determination in step S1101 is that the QR image has not been displayed on the operation display unit 214, the CPU 401 ends the present process. On the other hand, when a result of the determination in step S1101 is that the QR image has been displayed on the operation display unit 214, the CPU 401 causes the camera unit 411 to shoot the QR image. The CPU 401 acquires an IP address in a version compatible with a communication application installed in the mobile terminal 103, specifically, the IPv4 address of the MFP 101 from the shot QR image. After that, the CPU 401 determines whether or not the acquired IPv4 address is "0.0.0.0" (step S1102).

Figure 12:
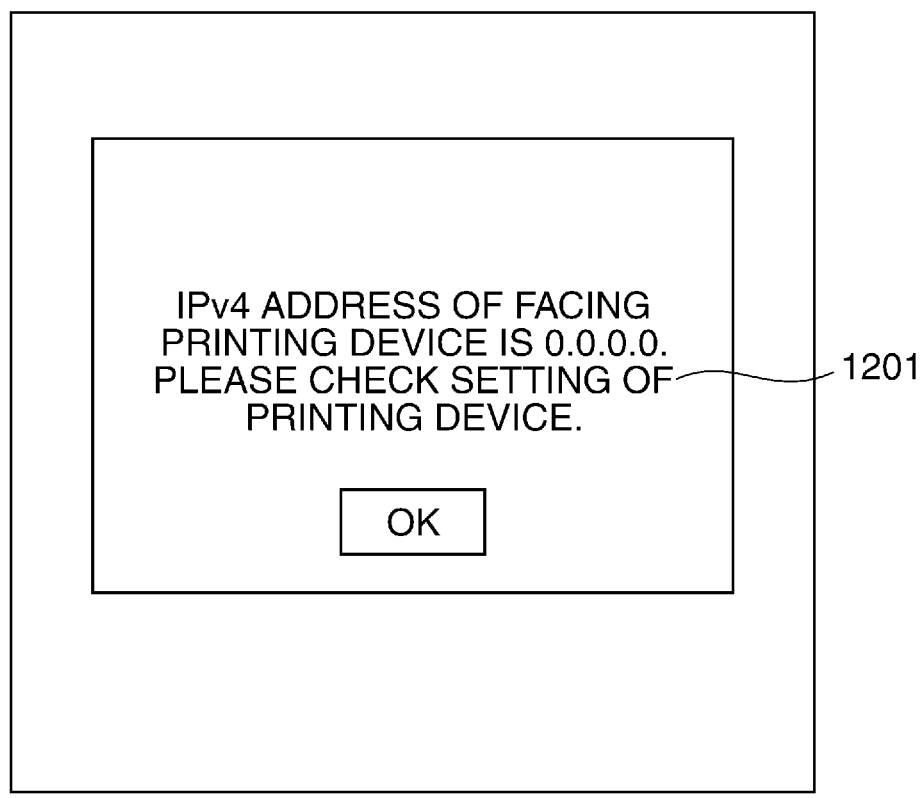
FIG. 12 is a diagram showing an example of an error message displayed on an operation display unit shown in FIG. 4.

When a result of the determination in step S1102 is that the acquired IPv4 address is "0.0.0.0", the CPU 401 displays an error message 1201 shown in FIG. 12 on the operation display unit 410 (step S1103). The error message 1201 includes a message indicating that the IPv4 address is "0.0.0.0", i.e., address information of the MFP 101 has not been set in the IPv4 address. After that, the CPU 401 ends the present process.

When a result of the determination in step S1102 is that the acquired IP address is not "0.0.0.0", the CPU 401 sets the acquired IP address (step S1104), and ends the present process.

In the processes shown in FIGS. 9 and 11, when the IPv4 address is unusable, the IPv4 address of "0.0.0.0" indicating that address information has not been set is output. Accordingly, the mobile terminal 103 incompatible with the IPv6 address does not acquire the IPv6 address, and the MFP 101 can notify a user that address information of the MFP 101 has not been set.

Furthermore, in the processes shown in FIGS. 9 and 11, when the IPv4 address is unusable, a QR image including an IPv4 address that indicates that address information of the MFP 101 has not been set is displayed. Accordingly, when the mobile terminal 103 acquires the IPv4 address from a QR image, it is possible to certainly notify the user of the fact that address information of the MFP 101 could not be obtained from the QR image.

Subsequently, a second embodiment of the present invention is described.

The second embodiment of the present invention is basically the same in configuration and action as the above-described first embodiment, and differs from the first embodiment of the present invention in that BLE communication is used as an output of an IP address; therefore, description of the overlapping configuration and action is omitted, and only differences in configuration and action are described.

Figure 13:
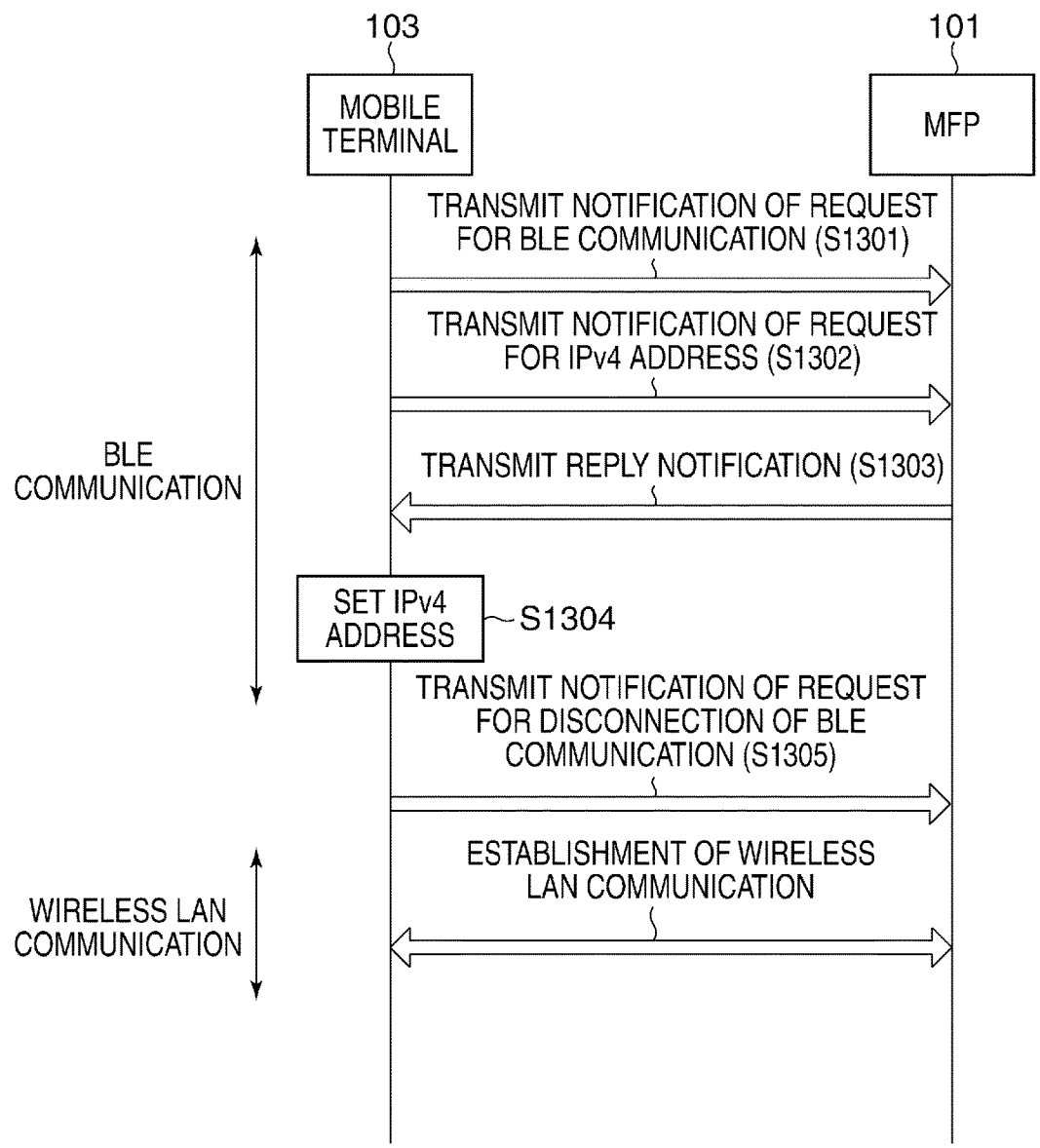
FIG. 13 is a timing chart showing the procedure of a wireless-LAN-communication setting process using BLE communication performed by the communication system shown in FIG. 1.

FIG. 13 is a timing chart showing the procedure of a wireless-LAN-communication setting process using BLE communication performed by the communication system 100 shown in FIG. 1.

In FIG. 13, first, when receiving an advertising packet, which indicates that the MFP 101 is capable of performing BLE communication, from the MFP 101, the mobile terminal 103 transmits a notification of request for BLE communication to the MFP 101 (step S1301). Accordingly, the MFP 101 and the mobile terminal 103 can perform BLE communication between them. Then, the mobile terminal 103 transmits a notification of request for an IP address in a version compatible with a communication application installed in the mobile terminal 103, for example, the IPv4 address of the MFP 101 to the MFP 101 (step S1302).

Figure 14A:
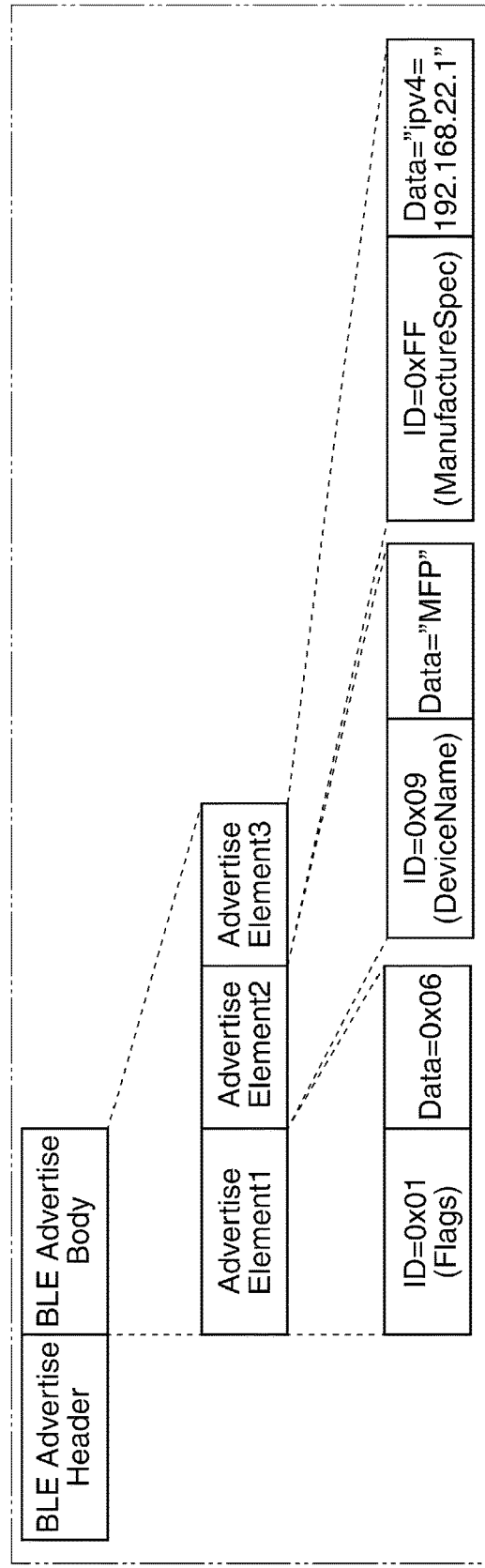
FIGS. 14A and 14B are diagrams for explaining a reply notification transmitted by the MFP shown in FIG. 1.

In response to the notification of request for the IPv4 address of the MFP 101 transmitted from the mobile terminal 103, the MFP 101 transmits a reply notification to the mobile terminal 103 (step S1303). The reply notification includes information required for wireless LAN communication. For example, when the use of the IPv4 address is allowed in the setting of the setting screen 300, the reply notification includes the IPv4 address of the MFP 101 as shown in FIG. 14A.

When receiving the reply notification from the MFP 101, the mobile terminal 103 sets the IPv4 address of the MFP 101 included in the reply notification (step S1304), and transmits a notification of request for disconnection of BLE communication to the MFP 101 (step S1305). Accordingly, between the MFP 101 and the mobile terminal 103, the BLE communication is disconnected, and wireless LAN communication is established. After that, the communication system 100 ends the present process.

Figure 15:
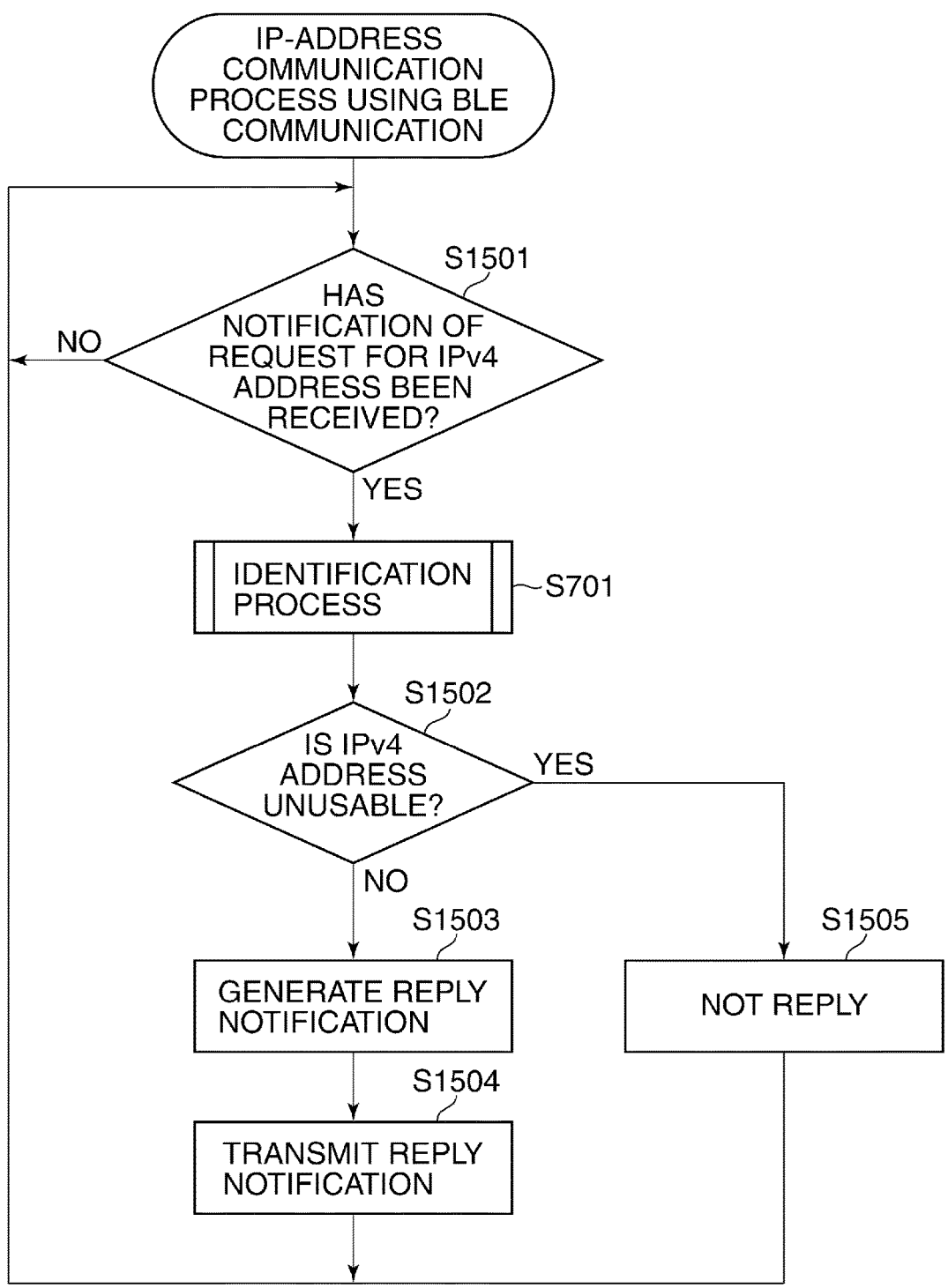
FIG. 15 is a flowchart showing the procedure of an IP-address communication process using BLE communication performed by the MFP shown in FIG. 1.

FIG. 15 is a flowchart showing the procedure of an IP-address communication process using BLE communication performed by the MFP 101 shown in FIG. 1.

The process shown in FIG. 15 is performed by the CPU 201 executing a program stored in the ROM 203 and the HDD 204, and it is assumed that the MFP 101 and the mobile terminal 103 can perform BLE communication between them. Furthermore, also in the process shown in FIG. 15, to make the description easy, it is assumed that the use of the IPv6 address has been allowed in the setting of the setting screen 300.

In FIG. 15, first, the CPU 201 determines whether or not the MFP 101 has received a notification of request for the IPv4 address of the MFP 101 (step S1501). The CPU 201 waits until the MFP 101 has received a notification of request for the IPv4 address of the MFP 101, and, when the MFP 101 has received the notification of request from the mobile terminal 103 (YES in step S1501), the CPU 201 performs the process in step S701 in FIG. 7. Then, the CPU 201 determines whether or not the IPv4 address of the MFP 101 is unusable on the basis of a result of identification in step S701 in FIG. 7 (step S1502).

When a result of the determination in step S1502 is that the IPv4 address of the MFP 101 is usable, the CPU 201 generates a reply notification including the IPv4 address of the MFP 101 (step S1503). Then, the CPU 201 transmits the reply notification to the mobile terminal 103 by BLE communication (step S1504), and returns to the process in step S1501.

When a result of the determination in step S1502 is that the IPv4 address of the MFP 101 is unusable, the CPU 201 does not reply the notification for request for the IPv4 address of the MFP 101 (step S1505). That is, in the present embodiment, when the IPv4 address of the MFP 101 is unusable, the CPU 201 does not transmit either the IPv4 address or the IPv6 address by BLE communication. After that, the CPU 201 returns to the process in step S1501.

In the process shown in FIG. 15, when the MFP 101 has received a notification of request for the IPv4 address of the MFP 101 from the mobile terminal 103, and the IPv4 address of the MFP 101 is unusable, neither the IPv4 address nor the IPv6 address is transmitted by BLE communication. Accordingly, it is possible to certainly prevent the IPv6 address from being transmitted to the mobile terminal 103 incompatible with the IPv6 address by BLE communication.

Figure 16:
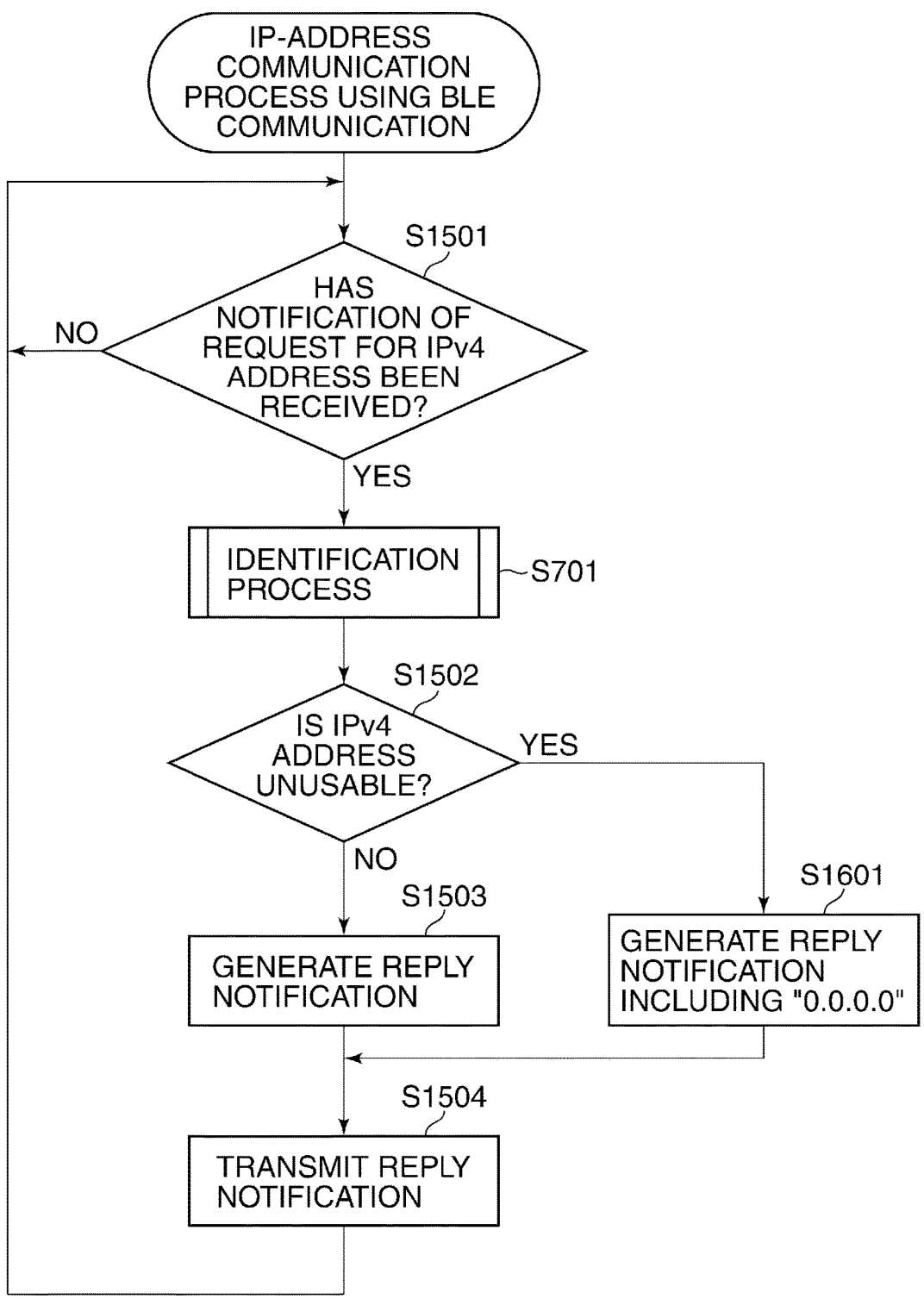
FIG. 16 is a flowchart showing the procedure of a variation of the IP-address communication process using BLE communication shown in FIG. 15.

FIG. 16 is a flowchart showing the procedure of a variation of the IP-address communication process using BLE communication shown in FIG. 15.

The process shown in FIG. 16 is performed by the CPU 201 executing a program stored in the ROM 203 and the HDD 204. Also in the process shown in FIG. 16, to make the description easy, it is assumed that the use of the IPv6 address has been allowed in the setting of the setting screen 300.

In FIG. 16, first, the CPU 201 performs the processes in steps S1501, S701, and S1502 in FIG. 15.

Figure 14B:
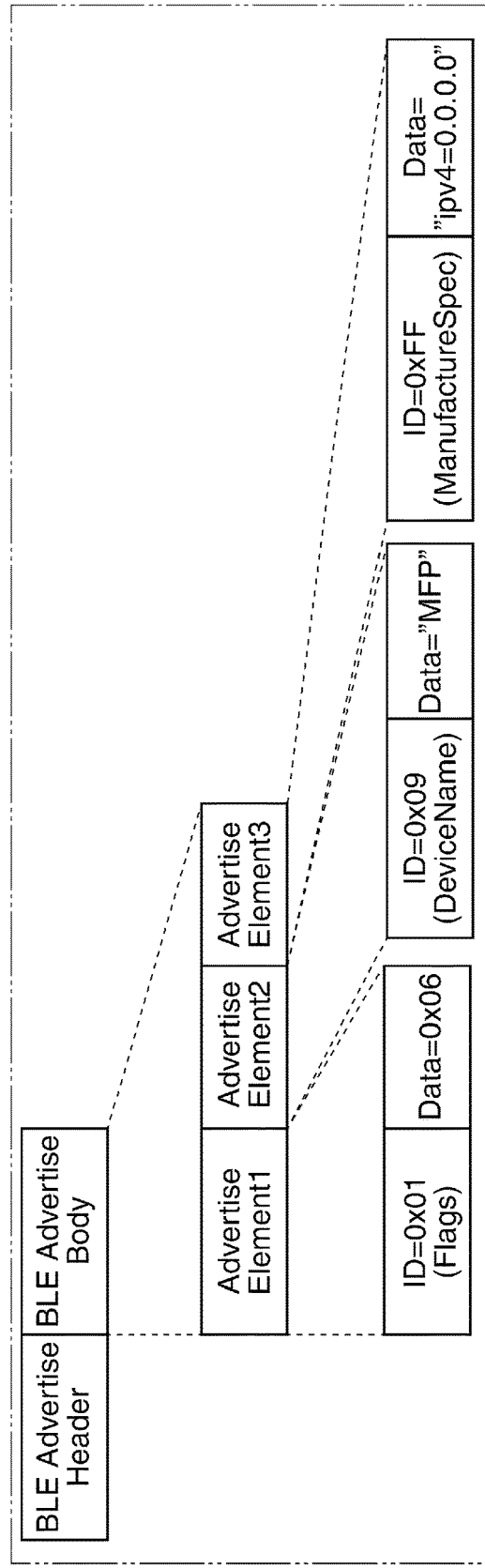

When a result of determination in step S1502 is that the IPv4 address of the MFP 101 is usable, the CPU 201 performs the processes in steps S1503 onward in FIG. 15. On the other hand, when a result of determination in step S1502 is that the IPv4 address of the MFP 101 is unusable, the CPU 201 generates a reply notification including an IPv4 address with "0.0.0.0" set as shown in FIG. 14B (step S1601). After that, the CPU 201 performs the processes in steps S1504 onward.

In the above-described process shown in FIG. 16, when the MFP 101 has received a notification of request for the IPv4 address from the mobile terminal 103, if the IPv4 address of the MFP 101 is unusable, a reply notification including an IPv4 address with "0.0.0.0" set is transmitted by BLE communication. Accordingly, when the mobile terminal 103 acquires the IPv4 address by BLE communication, it is possible to certainly notify the user of the fact that address information of the MFP 101 could not be obtained by the BLE communication.

In the present embodiment described above, it is assumed that BLE communication has been established between the MFP 101 and the mobile terminal 103; however, the MFP 101 can transmit the IPv4 address of "0.0.0.0" before the establishment of BLE communication. Specifically, the MFP 101 includes the IPv4 address of "0.0.0.0" in an advertising packet transmitted to perform the setting of BLE communication. Accordingly, without waiting until BLE communication has been established, it is possible to notify the user of the fact that address information of the MFP 101 cannot be obtained in advance by BLE communication.

Subsequently, a third embodiment of the present invention is described.

The third embodiment of the present invention is basically the same in configuration and action as the above-described first and second embodiments, and differs from the first and second embodiments of the present invention in that NFC communication is used as an output of an IP address; therefore, description of the overlapping configuration and action is omitted, and only differences in configuration and action are described.

Figure 18A:
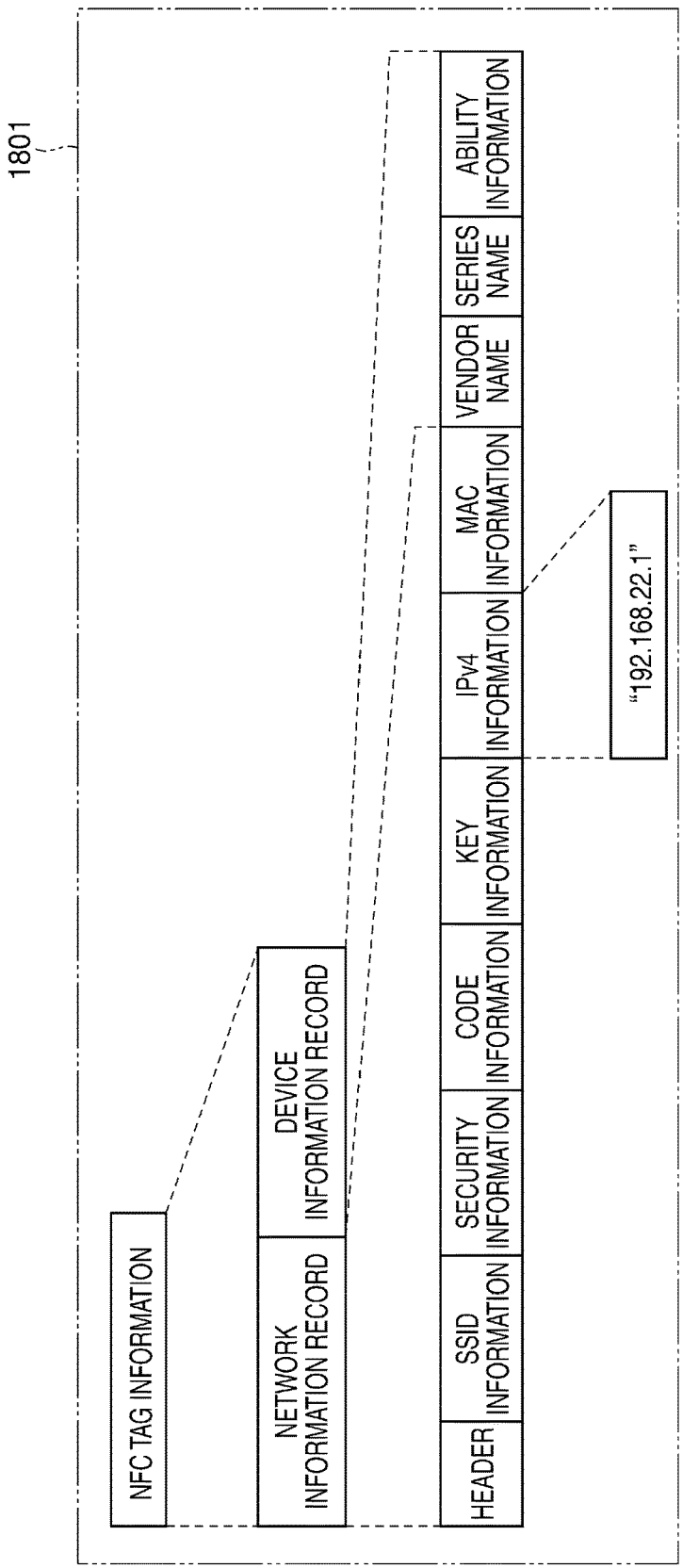
FIGS. 18A and 18B are diagrams for explaining NDEF data generated by the MFP shown in FIG. 1.

FIG. 17 is a timing chart showing the procedure of a wireless-LAN-communication setting process using NFC communication performed by the communication system 100 shown in FIG. 1. In the process shown in FIG. 17, it is assumed that NDEF data 1801 (management data) shown in FIG. 18A including information required for the setting of wireless LAN communication, such as an IP address of the MFP 101, has been stored in advance.

In FIG. 17, first, when a user has passed the mobile terminal 103 over the NFC communication unit 218 of the MFP 101, the mobile terminal 103 reads the NDEF data 1801 stored in the MFP 101 (step S1701). Then, the mobile terminal 103 acquires an IP address in a version compatible with a communication application installed in the mobile terminal 103, for example, the IPv4 address of the MFP 101 from the NDEF data 1801 (step S1702). Then, the mobile terminal 103 sets the acquired IPv4 address (step S1703). Accordingly, wireless LAN communication is established between the MFP 101 and the mobile terminal 103. After that, the communication system 100 ends the present process.

Figure 19:
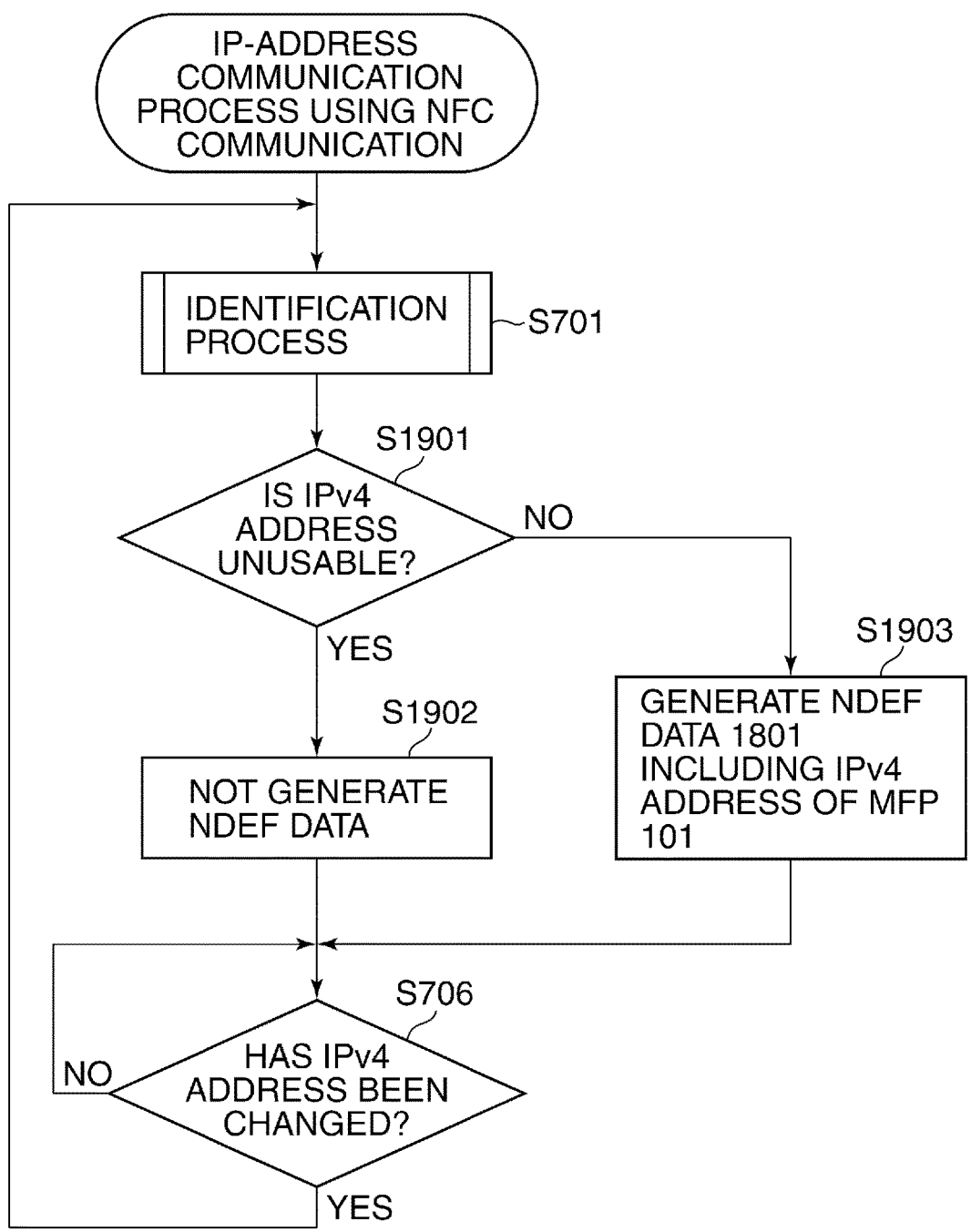
FIG. 19 is a flowchart showing the procedure of an IP-address communication process using NFC communication performed by the MFP shown in FIG. 1.

FIG. 19 is a flowchart showing the procedure of an IP-address communication process using NFC communication performed by the MFP 101 shown in FIG. 1.

The process shown in FIG. 19 is performed by the CPU 201 executing a program stored in the ROM 203 and the HDD 204. Also in the process shown in FIG. 19, to make the description easy, it is assumed that the use of the IPv6 address has been allowed in the setting of the setting screen 300.

In FIG. 19, first, the CPU 201 performs the process in step S701 in FIG. 7, and determines whether or not the IPv4 address of the MFP 101 is unusable on the basis of a result of identification in step S701 (step S1901).

When a result of the determination in step S1901 is that the IPv4 address of the MFP 101 is unusable, the CPU 201 does not generate NDEF data (step S1902). Then, the CPU 201 performs the processes in steps S706 onward in FIG. 7.

When a result of the determination in step S1901 is that the IPv4 address of the MFP 101 is usable, the CPU 201 generates the NDEF data 1801 including the IPv4 address of the MFP 101 (step S1903). After that, the CPU 201 writes the NDEF data 1801 in an NFC tag (not shown), and performs the processes in steps S706 onward in FIG. 7.

In the above-described process shown in FIG. 19, when the IPv4 address is unusable, NDEF data is not generated. Accordingly, it is possible to certainly prevent the mobile terminal 103 incompatible with the IPv6 address from acquiring the IPv6 address by NFC communication.

Figure 20:
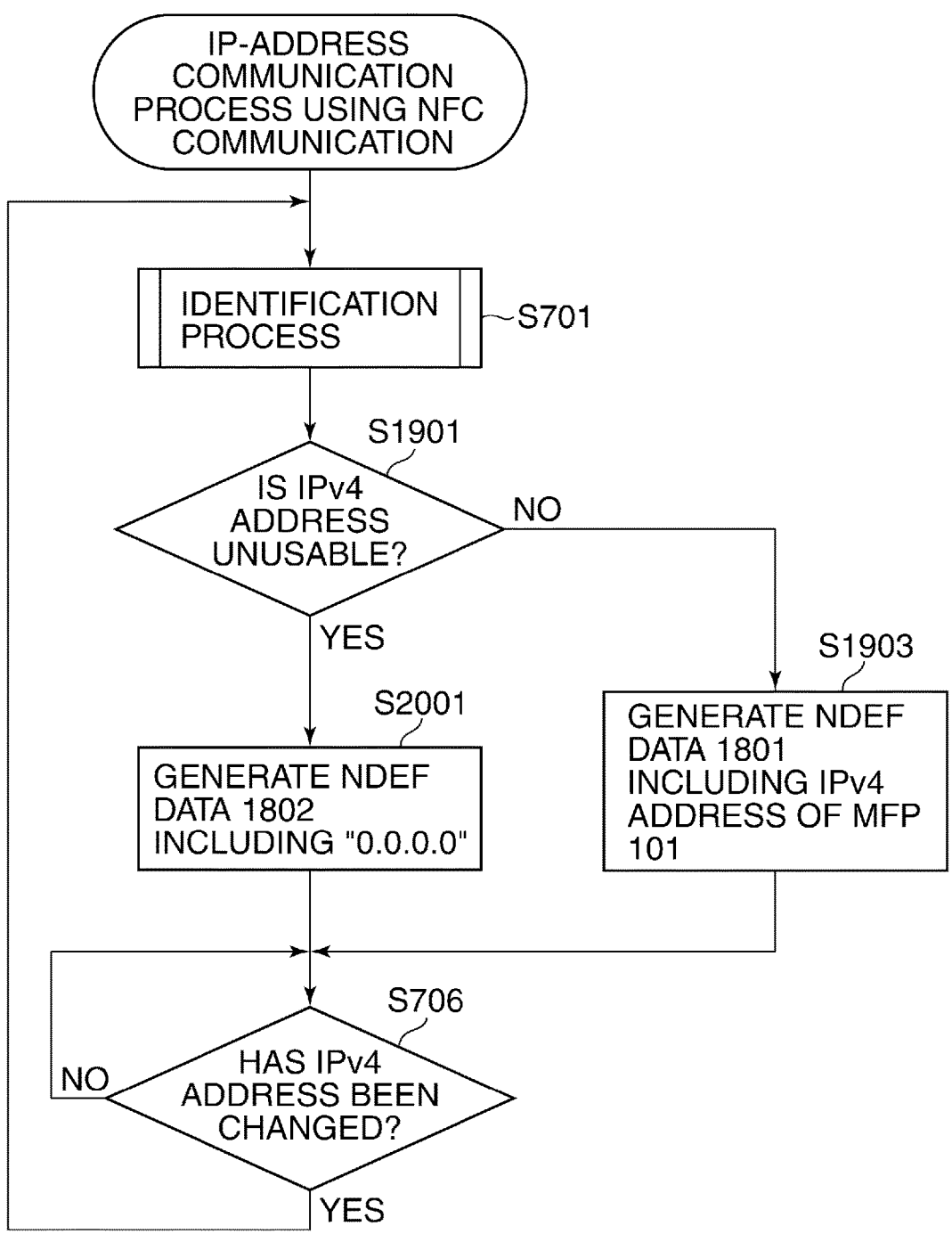
FIG. 20 is a flowchart showing the procedure of a variation of the IP-address communication process using NFC communication shown in FIG. 19.

FIG. 20 is a flowchart showing the procedure of a variation of the IP-address communication process using NFC communication performed by the MFP 101 shown in FIG. 1.

The process shown in FIG. 20 is performed by the CPU 201 executing a program stored in the ROM 203 and the HDD 204. Also in the process shown in FIG. 20, to make the description easy, it is assumed that the use of the IPv6 address has been allowed in the setting of the setting screen 300.

In FIG. 20, first, the CPU 201 performs the processes in steps S701 and S1901.

Figure 18B:
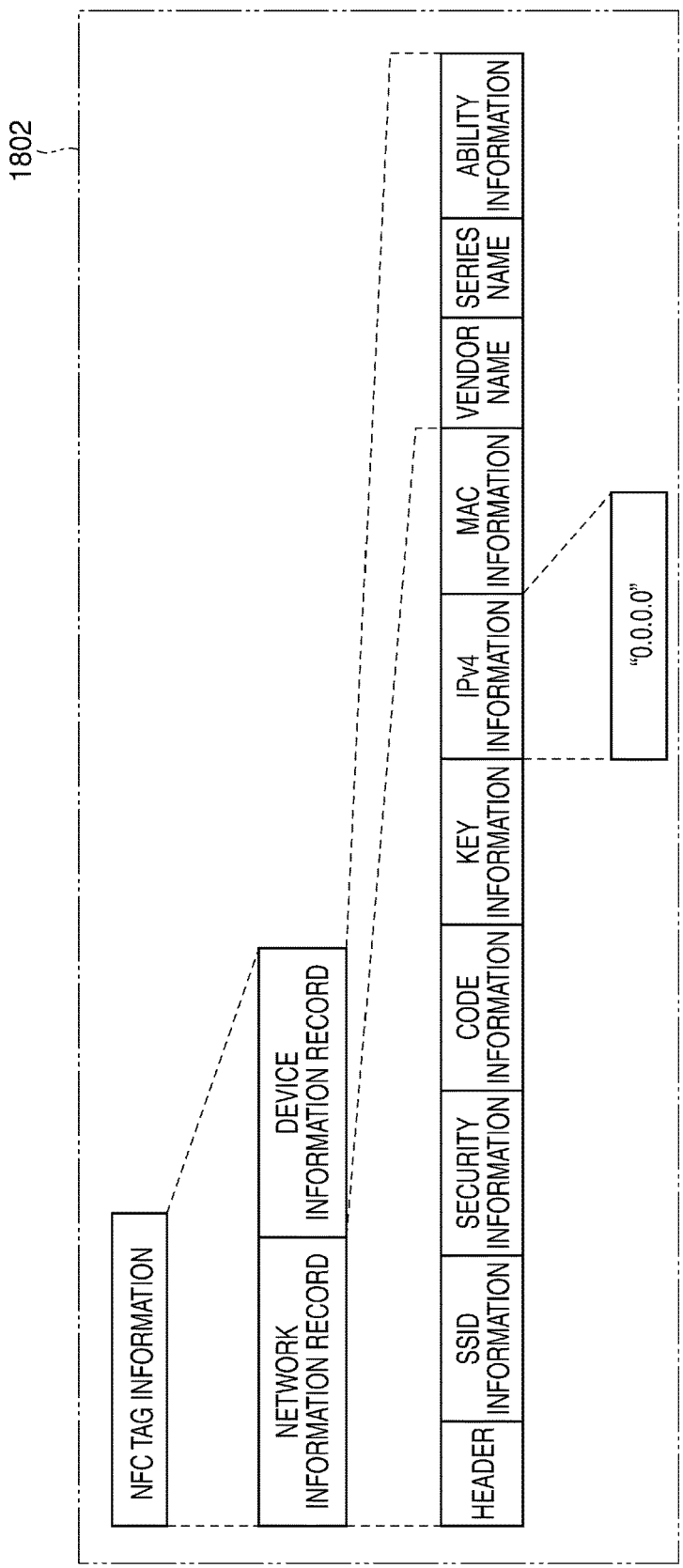

When a result of determination in step S1901 is that the IPv4 address of the MFP 101 is usable, the CPU 201 performs the processes in steps S1903 onward in FIG. 19. On the other hand, when a result of determination in step S1901 is that the IPv4 address of the MFP 101 is unusable, the CPU 201 generates NDEF data 1802 shown in FIG. 18B including an IPv4 address of "0.0.0.0" (step S2001). Then, the CPU 201 performs the processes in steps S706 onward in FIG. 7.

In the process shown in FIG. 20, when the IPv4 address is unusable, the NDEF data 1802 including the IPv4 address of "0.0.0.0" is generated. Accordingly, when the mobile terminal 103 acquires the IP address by NFC communication, it is possible to certainly notify the user of the fact that address information of the MFP 101 could not be obtained by the NFC communication.

In the present embodiment described above, there is described the cases where a QR image, BLE communication, and NFC communication are used as an output unit of an IP address; however, the output unit of an IP address is not limited to a QR image, BLE communication, and NFC communication. For example, an IP address of the MFP 101 can be output by using Zigbee, classic Bluetooth™, or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-096158, filed May 12, 2016 which is hereby incorporated by reference herein in its entirety.

What is claimed is:

1. A communication device that utilizes an internet protocol (IP) address for data communication with an external device, the communication device comprising:
   a display device; and
   at least one processor configured to control the display device so as to display a QR image including an IPv4 address of the communication device when the IPv4 address of the communication device is to be used by the communication device for data communication,
   wherein when the IPv4 address of the communication device is not to be used by the communication device for data communication and an IPv6 address of the communication device is to be used by the communication device for data communication, the display device does not display a QR image including the IPv6 address of the communication device so that the external device does not obtain the IPv6 address of the communication device from the communication device.

2. The communication device according to claim 1, wherein when the IPv4 address is not to be used by the communication device for data communication and the IPv6 address is to be used by the communication device for data communication, the at least one processor controls the display device so as to display a QR image including information indicating that the IPv4 address is not to be used by the communication device for data communication.

3. The communication device according to claim 1, wherein when the IPv4 address and the IPv6 address are both to be used by the communication device for data communication, the at least one processor controls the display device so as to display a QR image including not the IPv6 address of the communication device but the IPv4 address of the communication device.

4. The communication device according to claim 1, wherein the communication device is a printing device.

5. A communication device that utilizes an internet protocol (IP) address for data communication with an external device, the communication device comprising:
 a Bluetooth Low Energy (BLE) communicator configured to perform BLE communication; and
 at least one processor configured to control the BLE communicator so as to transmit an IPv4 address of the communication device to the external device when the IPv4 address of the communication device is to be used by the communication device for data communication,
 wherein when the IPv4 address of the communication device is not to be used by the communication device for data communication and an IPv6 address of the communication device is to be used by the communication device for data communication, the BLE communicator does not transmit the IPv6 address of the communication device to the external device so that the external device does not obtain the IPv6 address of the communication device from the communication device.

6. The communication device according to claim 5, wherein when the IPv4 address is not to be used by the communication device for data communication and the IPv6 address is to be used by the communication device for data communication, the at least one processor controls the BLE communicator so as to transmit information to the external device indicating that the IPv4 address is not to be used by the communication device for data communication.

7. The communication device according to claim 5, wherein when the IPv4 address and the IPv6 address are both to be used by the communication device for data communication, the at least one processor controls the BLE communicator so as to transmit not the IPv6 address of the communication device but the IPv4 address of the communication device to the external device.

8. The communication device according to claim 5, wherein the communication device is a printing device.

9. A control method for a communication device that includes a display device and that utilizes an internet protocol (IP) address for data communication with an external device, the control method comprising:
 controlling the display device so as to display a QR image including an IPv4 address of the communication device when the IPv4 address of the communication device is to be used by the communication device for data communication,
 wherein when the IPv4 address of the communication device is not to be used by the communication device for data communication and an IPv6 address of the communication device is to be used by the communication device for data communication, a QR image including the IPv6 address of the communication device is not displayed on the display device so that the external device does not obtain the IPv6 address of the communication device from the communication device.

10. A control method for a communication device that utilizes an internet protocol (IP) address for data communication with an external device, the control method, comprising:
 performing Bluetooth Low Energy (BLE) communication; and
 controlling to transmit an IPv4 address of the communication device to the external device when the IPv4 address of the communication device is to be used by the communication device for data communication,
 wherein when the IPv4 address of the communication device is not to be used by the communication device for data communication and an IPv6 address of the communication device is to be used by the communication device for data communication, the IPv6 address of the communication device is not transmitted to the external device so that the external device does not obtain the IPv6 address of the communication device from the communication device.

11. A computer-readable non-transitory storage medium storing a program for causing a computer to execute a control method for a communication device that includes a display device and that utilizes an internet protocol (IP) address for data communication with an external device, the control method comprising:
 controlling the display device so as to display a QR image including an IPv4 address of the communication device when the IPv4 address of the communication device is to be used by the communication device for data communication,
 wherein when the IPv4 address of the communication device is not to be used by the communication device for data communication and an IPv6 address of the communication device is to be used by the communication device for data communication, a QR image including the IPv6 address of the communication device is not displayed on the display device so that the external device does not obtain the IPv6 address of the communication device from the communication device.

12. A computer-readable non-transitory storage medium storing a program for causing a computer to execute a control method for a communication device that utilizes an internet protocol (IP) address for data communication with an external device, the control method comprising:
 performing Bluetooth Low Energy (BLE) communication; and
 controlling to transmit an IPv4 address of the communication device to the external device when the IPv4 address of the communication device is to be used by the communication device for data communication,
 wherein when the IPv4 address of the communication device is not to be used by the communication device for data communication and an IPv6 address of the communication device is to be used by the communication device for data communication, the IPv6 address of the communication device is not transmitted to the external device so that the external device does not obtain the IPv6 address of the communication device from the communication device.

* * * * *